United States Patent
Lee et al.

(10) Patent No.: US 9,335,850 B2
(45) Date of Patent: May 10, 2016

(54) TOUCH SCREEN GUIDE

(71) Applicant: Hyundai Motor Company, Seoul (KR)

(72) Inventors: Hui Sung Lee, Gyeonggi-do (KR); Sung Min Park, Seoul (KR); Kwang Myung Oh, Daejeon (KR); Sung Jin Sah, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/464,200

(22) Filed: Aug. 20, 2014

(65) Prior Publication Data
US 2015/0286303 A1 Oct. 8, 2015

(30) Foreign Application Priority Data
Apr. 4, 2014 (KR) ........................ 10-2014-0040442

(51) Int. Cl.
*G06F 3/041* (2006.01)
(52) U.S. Cl.
CPC ..................................... *G06F 3/041* (2013.01)
(58) Field of Classification Search
None
See application file for complete search history.

(56) References Cited

U.S. PATENT DOCUMENTS

2012/0050165 A1   3/2012   Kim et al.
2015/0220147 A1*  8/2015   King ....................... G06F 3/016
                                                      345/173

FOREIGN PATENT DOCUMENTS

| JP | 2013-073376 A | 4/2013 |
| KR | 10-2007-0106888 A | 11/2007 |
| KR | 20090076125 A | 7/2009 |
| KR | 2010-0002407 U | 3/2010 |
| KR | 10-1194528 A | 3/2012 |
| KR | 2013-0003238 U | 5/2013 |
| KR | 2013-0005409 U | 9/2013 |

* cited by examiner

*Primary Examiner* — Nicholas Lee
(74) *Attorney, Agent, or Firm* — Mintz Levin Cohn Ferris Glovsky and Popeo, P.C.; Peter F. Corless (57) ABSTRACT

A touch screen guide is provided that includes an edge-shaped frame disposed on a surface of a touch screen and both ends of an inside surface of the edge-shaped frame includes first guide grooves. A menu guide has both ends movably inserted into the first guide grooves of the frame, a substantial center is longitudinally provided with a moving space, and upper and lower portions of an inside are provided with second guide grooves. A touch guide includes upper and lower portions movably inserted into the second guide grooves of the menu guide and a substantial center is provided with an insertion space. Accordingly, a user may recognize which button is being operated when touching the touch screen viewing the screen to prevent the touch screen from being erroneously operated, thereby improving the convenience of use and the marketability.

9 Claims, 8 Drawing Sheets

TOUCH SCREEN GUIDE

CROSS-REFERENCE TO RELATED APPLICATION

This application is based on and claims the benefit of priority to Korean Patent Application No. 10-2014-0040442, filed on Apr. 4, 2014 in the Korean Intellectual Property Office, the disclosure of which is incorporated herein in its entirety by reference.

TECHNICAL FIELD

The present disclosure relates to a touch screen guide, and more particularly, to a touch screen guide that allows a user to recognize which button the user is operating when touching a touch screen without viewing the screen.

BACKGROUND

Generally, a touch screen may be linked with a computer through a screen to directly input or output information and detect coordinates of a touched position when a hand or an object applies pressure at a character or a specific position which is displayed on a screen to carry out specific processing that corresponds to a menu of coordinates selected by software from coordinates. Therefore, the touch screen operates as an information display unit and as an input unit. However, menus or buttons on the touch screen used within the vehicle are difficult to be selected without viewing the screen and the user may not have conviction of a finger position for a specific position, such that the convenience of use may be reduced or the touch screen may be erroneously operated frequently, thereby reducing marketability.

SUMMARY

The present disclosure has been made to solve the above-mentioned problems occurring in the prior art while advantages achieved by the prior art are maintained intact. An aspect of the present disclosure provides a touch screen guide, and more particularly, a touch screen guide that allows a user to recognize which button is being operated when applying pressure to a touch screen without viewing the screen.

According to an exemplary embodiment of the present disclosure, a touch screen guide may include: an edge-shaped frame disposed on a surface of a touch screen and both ends of an inside surface include first guide grooves; a menu guide having both ends movably inserted into the first guide grooves of the frame, a center longitudinally having a moving space, and upper and lower portions of an inside surface having second guide grooves; and a touch guide having upper and lower portions movably inserted into the second guide grooves of the menu guide and a center having an insertion space.

The lower surface of the menu guide may include a menu tag that detects a position of the menu guide on the touch screen. The touch screen guide may further include: a fixing guide disposed on a surface of the touch screen and having a plurality of insertion spaces provided therein.

According to another exemplary embodiment of the present disclosure, a touch screen guide may include: an edge-shaped frame disposed on a surface of a touch screen and both ends of an inside surface include with first guide grooves; and a fixing guide having both ends fixedly inserted into the first guide grooves of the frame and an inside having a plurality of insertion spaces.

Both ends of a lower surface of the fixing guide may include an adsorption tag detached from the touch screen. A pair of adsorption tags may be each provided at both ends of the fixing guide and each adsorption tag may have different materials or sizes. In addition, both ends of the lower surface of the fixing guide may include an optical tag detached from the touch screen. The optical tag may include a quick response (QR) code which is linked with the touch screen.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Exemplary embodiments of the present disclosure will be described in detail with reference to the accompanying drawings.

First Exemplary Embodiment

Figure 1A:
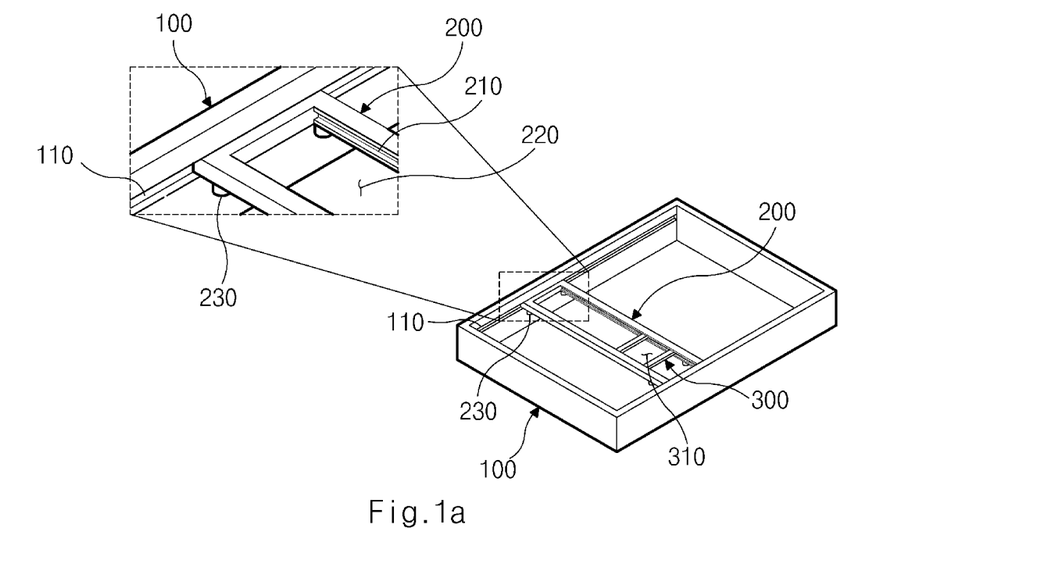
FIGS. 1A and 1B are exemplary diagrams illustrating a touch screen guide according to a first exemplary embodiment of the present disclosure.
Figure 1B:
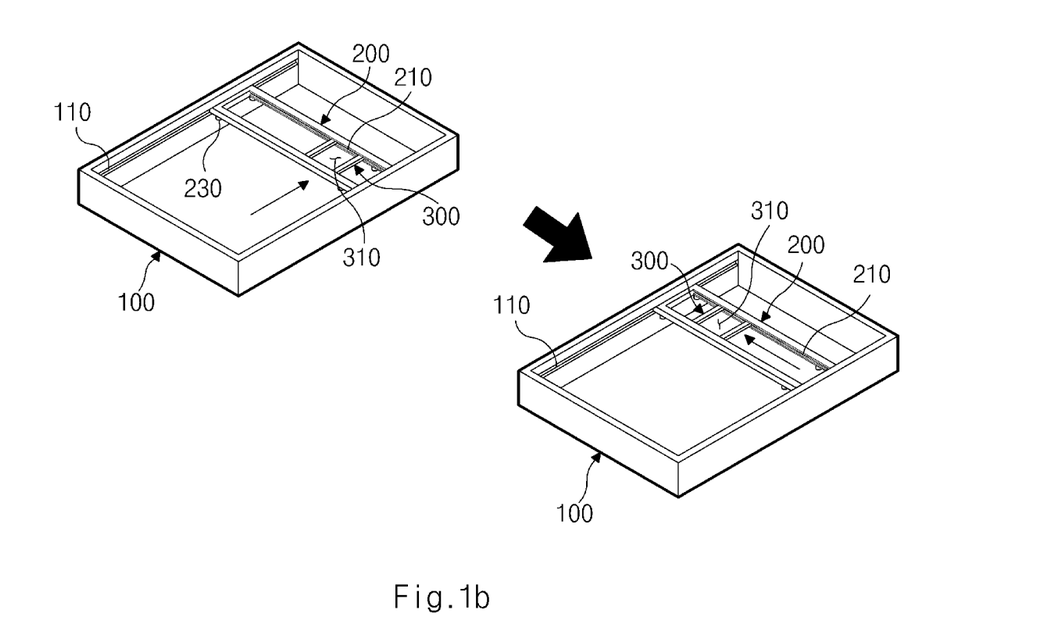

As illustrated in FIGS. 1A and 1B, a touch screen guide according to a first exemplary embodiment of the present disclosure may include a frame disposed on a surface of a touch screen 10 (see FIGS. 4A to 4C), a menu guide 200 movably inserted into the frame, and a touch guide 300 movably inserted into the menu guide 200.

The frame 100 may have a substantially rectangular frame shape and may be disposed on a surface of the touch screen 10. In particular, the shape of the frame 100 may be provided in various shapes according to a shape of the touch screen 10. Further, both ends of an inner side of the frame 100 may be longitudinally provided with first guide grooves 100. The menu guide 200 may have a substantially rectangular frame shape and both ends thereof may be inserted into the first guide grooves 110 of the frame 100 to be movably provided along the first guide grooves 110. In particular, a center of the menu guide 200 may be longitudinally provided with a moving space 220 and an upper portion and a lower portion of an inner side thereof may be longitudinally provided with second guide grooves 210 and thus the touch guide 300 to be described below may move along the second guide grooves 210.

Meanwhile, a lower surface of the menu guide 200 may include a menu tag 230 to detect a position of the menu guide 200 on the touch screen 10. The touch guide 300 may have a substantially rectangular frame shape and the upper and lower portions thereof may be inserted into the second guide grooves 210 of the menu guide 200 to be movably provided along the second guide grooves 210. A substantial center of the touch guide 300 may include an insertion space 310 and thus a user may touch the touch screen 10 through the guide of the touch screen 10 (e.g., pressure may be applied to the touch screen through the guide) according to the exemplary embodiment of the present disclosure. In particular, the touch guide 300 may be a substantially rectangular shape as described above but may have various shapes such as a triangle and a circle.

Further, the menu guide 200 and the touch guide 300 may be made of a transparent material or an opaque material, but may be formed in various colors in the case of the opaque material and thus may be variously formed depending on the color of the touch screen 10. As such, according to the exemplary embodiment of the present disclosure, the menu guide 200 may be configured to move vertically along the frame 100 disposed on the surface of the touch screen 10 and the touch guide 300 may be configured to move horizontally in the moving menu guide 200 and the position of the menu guide 200 may be analyzed in the touch screen 10 by the menu tag 230 disposed on a lower surface of the menu guide 200 to drive (e.g., operate) the menu and software of the touch screen 100 that corresponds to the position of the menu guide 200.

In particular, the menu of the touch screen 10 for controlling software may be disposed at a lower portion of the menu guide 200 and thus may be selected by moving the touch guide 300 using the user's finger (e.g., applied pressure) and when the menu guide 200 moves again after the menu is selected, the menu and the software that corresponds to the moving position are driven and the previously driven menu and software end. Meanwhile, when the touch screen guide according to the exemplary embodiment of the present disclosure is separated from the touch screen 10, the touch screen 10 may be operated by the existing method.

Figure 4A:
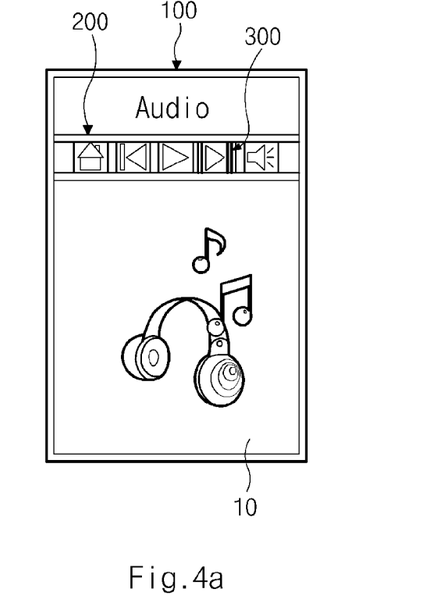
FIGS. 4A to 4C are exemplary diagrams illustrating a use example of the touch screen guide according to a first exemplary embodiment of the present disclosure.
Figure 4B:
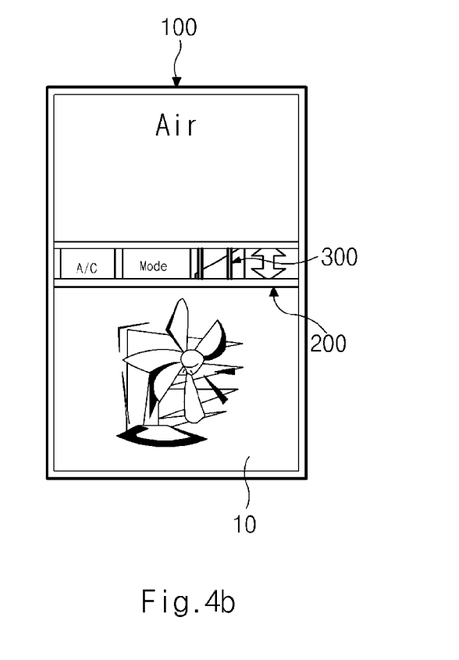
Figure 4C:
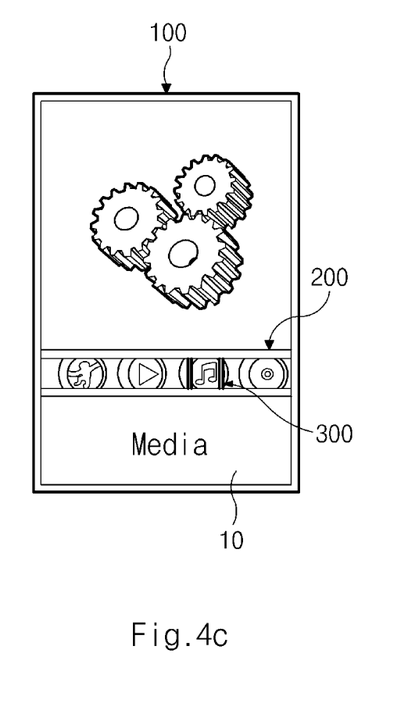

FIGS. 4A to 4C are exemplary diagrams illustrating a use example of the sliding type menu guide 200 of the touch screen guide according to the first exemplary embodiment of the present disclosure, in which when the menu guide 200 is disposed at an upper end of the touch screen 10, an audio control menu and a picture composition of the touch screen 10 may be operated and may be selected using a desired menu or button by moving the touch guide 300. Further, when the menu guide 200 moves to be positioned at about a middle of the touch screen 10, an air conditioning control menu and the picture composition may be operated and when the menu guide 200 moves to the lower end of the touch screen 10, the media select menu and the screen composition may be operated.

Second Exemplary Embodiment

Figure 2A:
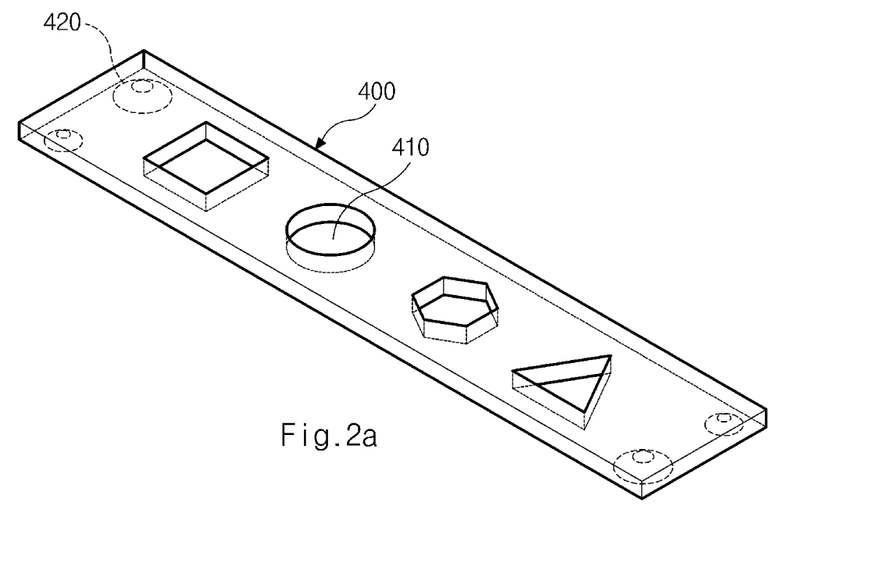
FIGS. 2A and 2B are exemplary diagrams illustrating a state in which a touch screen guide according to a second exemplary embodiment of the present disclosure is provided with an adsorption tag.
Figure 2B:
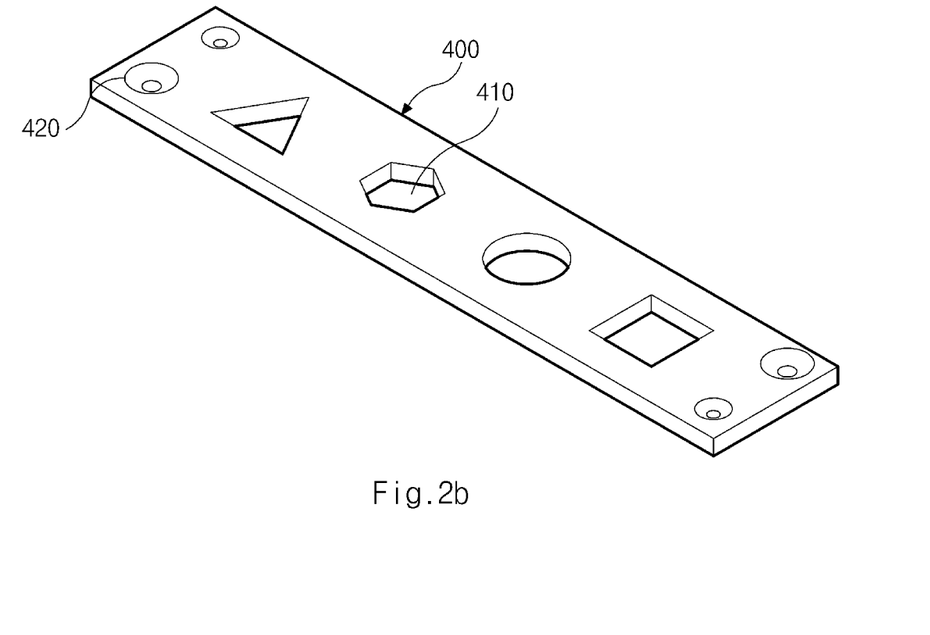
Figure 3A:
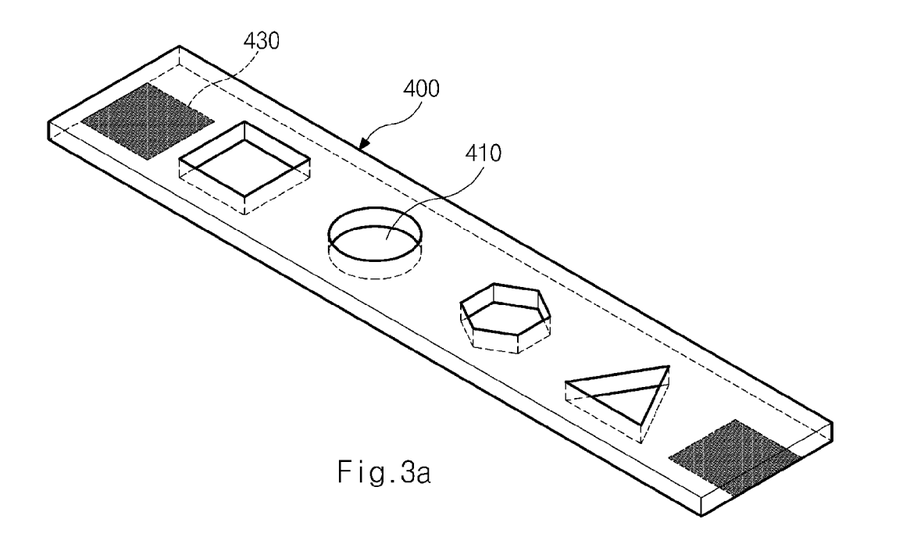
FIGS. 3A and 3B are exemplary diagrams illustrating a state in which the touch screen guide according to the second exemplary embodiment of the present disclosure is provided with an optical tag.
Figure 3B:
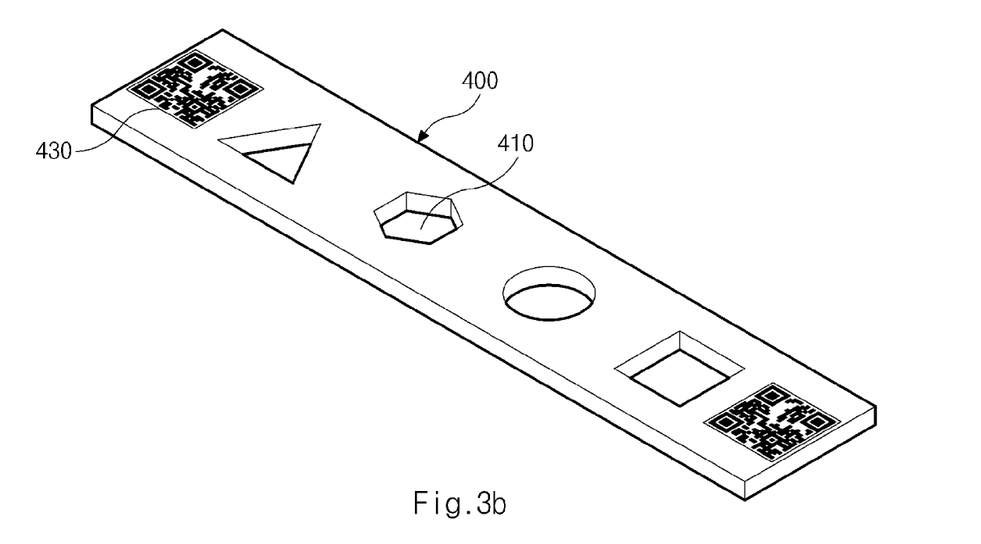
Figure 5A:
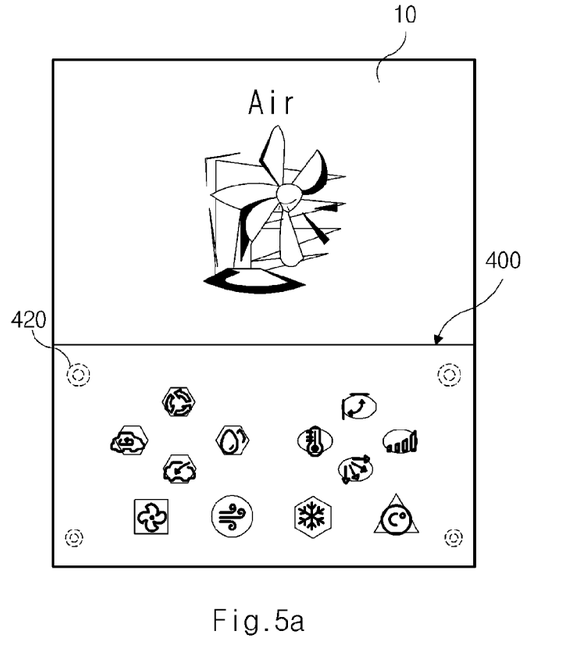
FIGS. 5A and 5B and 6A and 6B are exemplary diagrams illustrating a use example of the touch screen guide according to the second exemplary embodiment of the present disclosure.
Figure 5B:
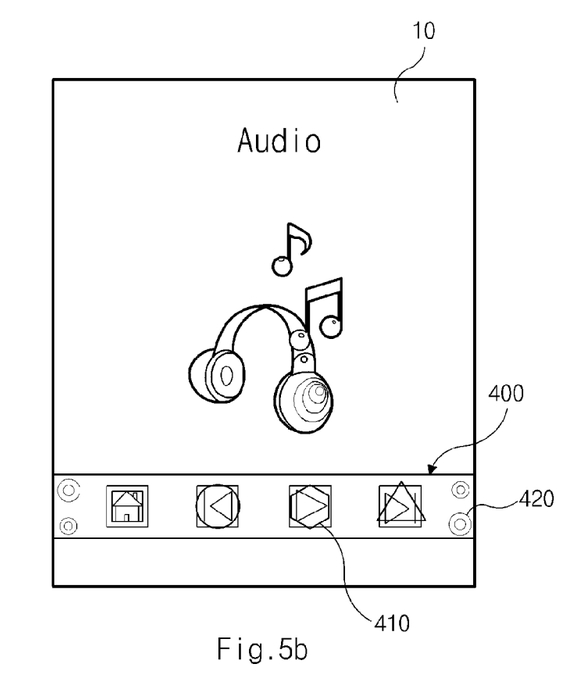

As illustrated in FIGS. 2 and 3, the touch screen guide according to the exemplary embodiment of the present disclosure may include a fixing guide 400 disposed on the surface of the touch screen 100 (see FIGS. 5A and 5B). The fixing guide 400 may have a substantially rectangular plate shape and both ends thereof may be fixedly inserted into the first guide groove 110 of the frame 100. In particular, the fixing guide 400 may include a plurality of insertion spaces 410 and the user may touch the touch screen 10 using the guide of the touch screen (e.g., pressure may be applied to the touch screen using the guide of the touch screen) according to the exemplary embodiment of the present disclosure. In addition, both ends of a lower surface of the fixing guide 400 may include an adsorption tag 420 which may be detached from the touch screen 10 to fix the fixing guide 400 to the touch screen 10. Particularly, the insertion space 410 of the fixing guide 400 may have a substantially circular form to allow the user's finger or an object be inserted thereinto and may have various shapes such as a quadrangular shape, a triangular shape, and a star shape.

Further, the fixing guide 400 may be made of a transparent material or an opaque material, but may be formed in various colors in the case of the opaque material and thus may be variously formed depending on the color of the touch screen 10. In particular, a pair of adsorption tags 420 may be disposed at both ends of the fixing guide 420 and each adsorption tag 420 may be formed to have different materials or sizes to be able to select a menu at the time of an electrostatic tag. Meanwhile, instead of the adsorption tag 420, both ends of the lower surface of the fixing guide 400 may include optical tags 430 which may be detached from the touch screen 10. The optical tag 430 may be detachably attached to the touch screen 10 by an adhesive material.

In Particular, the optical tag 430 may include a QR code linked with the touch screen 10 to recognize the menu of the touch screen 10. Meanwhile, the lower surface of the fixing guide 400 may include the adsorption tag 420 and the optical tag 430 together. According to the exemplary embodiment of the present disclosure, the surface of the touch screen 10 may be fixed with the fixing guide 400 to operate the menu and software of the touch screen 10 through the insertion space 410 formed in the fixing guide 400. In particular, when the lower surface of the fixing guide 400 includes the electrostatic type adsorption tag 420, the size and disposition of the adsorption tag 420 may be recognized and the touch screen may be configured to confirm whether the touch screen guide is mounted and when the lower surface of the fixing guide 400 includes the optical type optical tag 430, the optical tag 430 may be recognized to confirm whether the touch screen guide according to the exemplary embodiment of the present disclosure is mounted.

As a result, the menu and the software which may be configured to provide the information may be operated through the adsorption tag 420 or the optical tag 430 and the menu that corresponds to the driven software may be present at the lower portion of the fixing guide 400 for the form of the insertion space 410 to be recognizable without viewing the menu, thereby following the position of the finger and selecting the menu suited therefor. Meanwhile, when the touch screen guide according to the exemplary embodiment of the present disclosure is separated from the touch screen 10, the touch screen 10 may be operated by the existing method.

Figure 6A:
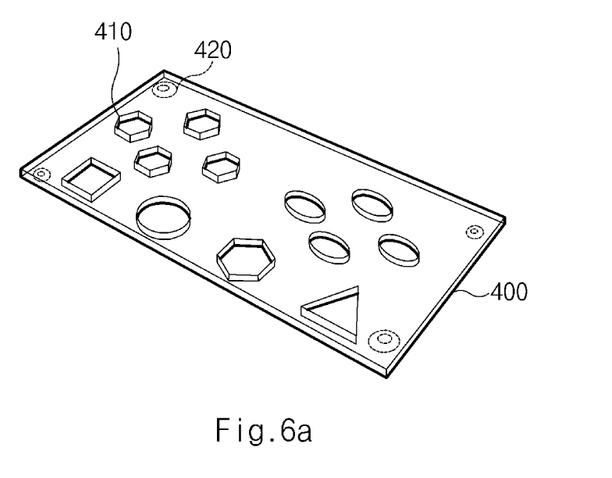
Figure 6B:
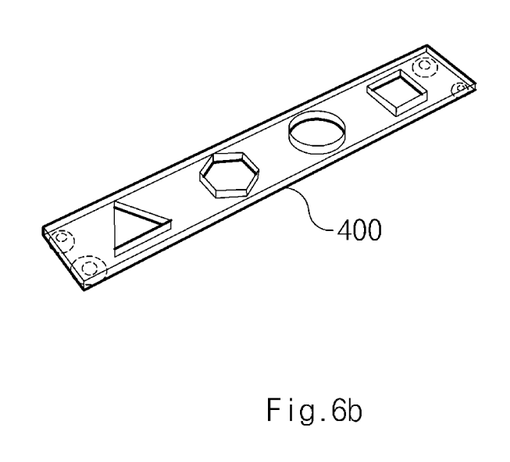

FIGS. 5A and 5B and 6A and 6B are exemplary diagrams illustrating the use example of the attachment type fixing guide 400 of the touch guide according to the second exemplary embodiment of the present disclosure and as illustrated in FIGS. 5A and 5B and 6A, when an air conditioning control fixing guide is attached to the touch screen 10, the menu and the picture composition required for the air conditioning control may be operated. Further, the air conditioning control fixing guide 400 may be removed and as illustrated in FIGS. 5A and 5B and 6B, when an audio fixing guide 400 is attached, the menu and the picture composition required for audio control may be operated.

Figure 7A:
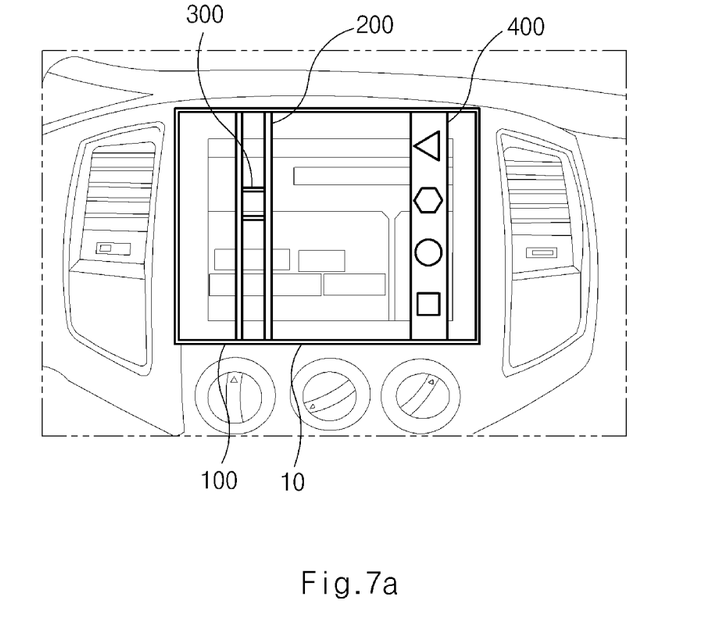
FIGS. 7A and 7B are exemplary diagrams illustrating a use example of a touch screen guide according to a third exemplary embodiment of the present disclosure.
Figure 7B:
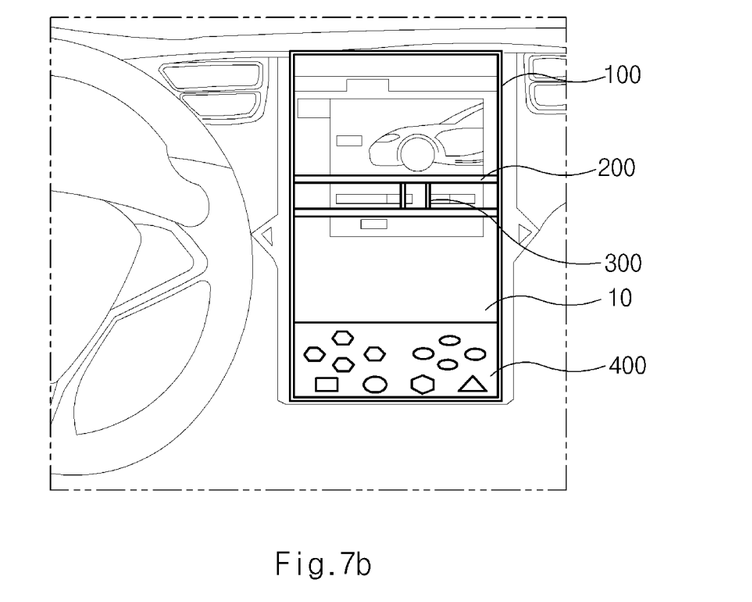

Further, as illustrated in FIGS. 7A and 7B, according to the touch screen guide according to a third exemplary embodiment of the present disclosure, the frame 100 may include the menu guide 200 which may include the touch guide 300 along the touch screen and the fixing guide 400 which may include the plurality of insertion space 410. However, the description of the frame 100 the menu guide 200, the touch guide 300, and the fixing guide 400 are the same as the first exemplary embodiment and the second exemplary embodiment of the present disclosure and therefore the description thereof will be omitted.

As described above, according to the exemplary embodiments of the present disclosure, the user may recognize which button the user is operating when pressure is applied to (e.g., when the user touches the screen) the touch screen without viewing the screen to prevent the touch screen from being erroneously operated, thereby improving the convenience of use and the marketability.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present disclosure.

What is claimed is:

1. A touch screen guide, comprising:
    an edge-shaped frame disposed on a surface of a touch screen and both ends of an inside surface of the edge-shaped frame include first guide grooves;
    a menu guide having both ends movably inserted into the first guide grooves of the frame, a substantial center longitudinally provided with a moving space, and upper and lower portions of an inside surface provided with second guide grooves; and
    a touch guide having upper and lower portions movably inserted into the second guide grooves of the menu guide and a substantial center provided with an insertion space.

2. The touch screen guide according to claim 1, wherein the lower surface of the menu guide includes a menu tag configured to detect a position of the menu guide on the touch screen.

3. A touch screen guide, comprising:
    a fixing guide disposed on a surface of the touch screen and having a plurality of insertion spaces provided therein; and
    an optical tag provided on both ends of the lower surface of the fixing guide, the optical tag being detached from the touch screen.

4. The touch screen guide of claim 3, wherein both ends of a lower surface of the fixing guide are provided with an adsorption tag which is detached from the touch screen.

5. A touch screen guide, comprising:
    an edge-shaped frame disposed on a surface of a touch screen and both ends of an inside surface of the edge-shaped frame include first guide grooves; and
    a fixing guide having both ends fixedly inserted into the first guide grooves of the frame and an inside provided with a plurality of insertion spaces.

6. The touch screen guide according to claim 5, wherein both ends of a lower surface of the fixing guide are provided with an adsorption tag which is detached from the touch screen.

7. The touch screen guide according to claim 6, wherein a pair of adsorption tags is each provided at both ends of the fixing guide and each adsorption tag is provided with different materials or sizes.

8. The touch screen guide according to claim 5, wherein both ends of the lower surface of the fixing guide are provided with an optical tag which is detached from the touch screen.

9. The touch screen guide according to claim 8, wherein the optical tag includes a quick response (QR) code linked with the touch screen.

* * * * *